UNITED STATES PATENT OFFICE.

EUGÉNE DONARD AND HENRI LABBÉ, OF PARIS, FRANCE.

PHARMACEUTICAL COATING.

No. 874,310.   Specification of Letters Patent.   Patented Dec. 17, 1907.

Application filed January 16, 1906. Serial No. 296,439.

*To all whom it may concern:*

Be it known that we, EUGÉNE DONARD and HENRI LABBÉ, citizens of the Republic of France, and residents of Paris, France, have jointly invented certain new and useful Improvements in Pharmaceutical Coating, of which the following is a specification.

This invention relates to pharmaceutical coating, including coating or varnishing with a material applied directly to an alimentary, medicinal, therapeutical, or like substance; capsules in which the substance is inclosed, or admixture of the coating material with the substance to be protected so as to coat each particle of the substance. The coating material employed is maizin; and the object is to protect the substance from the influence of oxygen, moisture and certain liquids of the animal organism.

The preparation of maizin will be found described in U. S. Patent No. 744,510, dated November 17, 1903. It is a proteid of very remarkable properties being soluble in the alcohols, in acetone, and in a number of other organic solvents, particularly acetic acid. It is moreover highly resistant to the action of oxygen and moisture and of the acid liquids of the stomach, but is readily digested and assimilated by the alkaline juices and the ferments of the intestines. These qualities point to it as a most suitable agent for the protection, by coating, capsuling, or otherwise enveloping, the said alimentary, medicinal and therapeutical substances, against the destructive and dissolving agencies above referred to, and more especially in cases when it is desired that the pills or capsules should pass unaltered to and into the intestines.

This invention may be carried out in several ways. A concentrated solution of the maizin having been prepared in one or other of the above quoted solvents, it may in some cases be simply mixed with the substances which it is desired to protect, the mixture being then allowed to dry. Or the solution may be used as a varnish, which is applied to and allowed to dry on the surface of the substances to be protected, as in the case of pills or like solid masses. Or the solution may be used for the preparation, in a suitable basin, say a tin plate, of a film which is subsequently treated in the usual way, and with the usual apparatus employed in the manufacture of globules or capsules for the administration of medicines in the liquid form.

Having thus described our invention and the method of carrying it out, we claim—

1. An envelop consisting of maizin adapted to contain a therapeutical substance and to protect the latter from the action of the liquids of the stomach.

2. The herein described process of protecting substances against the injurious effect of certain agencies to which they are exposed, which consists in first dissolving maizin in an organic liquid solvent, and then inclosing the particles of the substance to be protected in the coating formed by the maizin thus dissolved.

In witness whereof we have hereunto signed our names this 29th day of December 1905, in the presence of two subscribing witnesses.

EUGÉNE DONARD.
HENRI LABBÉ.

Witnesses:
JULES ARMENGAUD, Jeune,
HANSON C. COXE.